Oct. 27, 1925.
W. R. MOTT
1,559,349
ELECTRICAL CONNECTION
Filed March 25, 1922    2 Sheets-Sheet 1
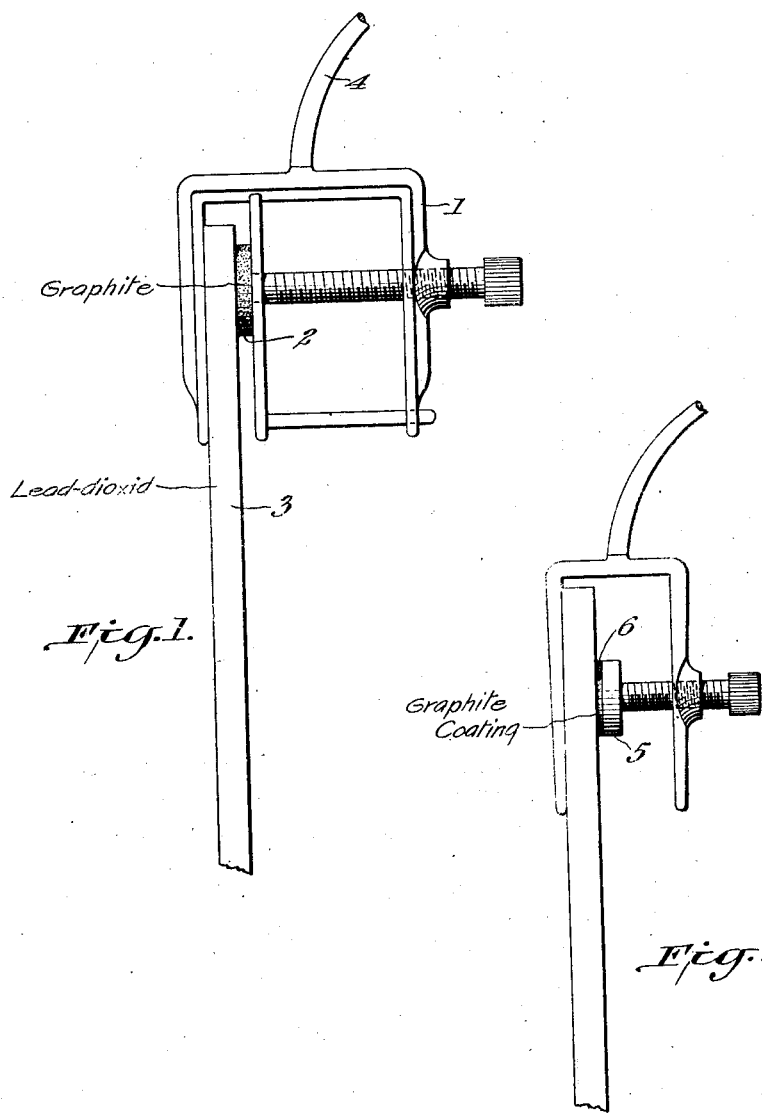

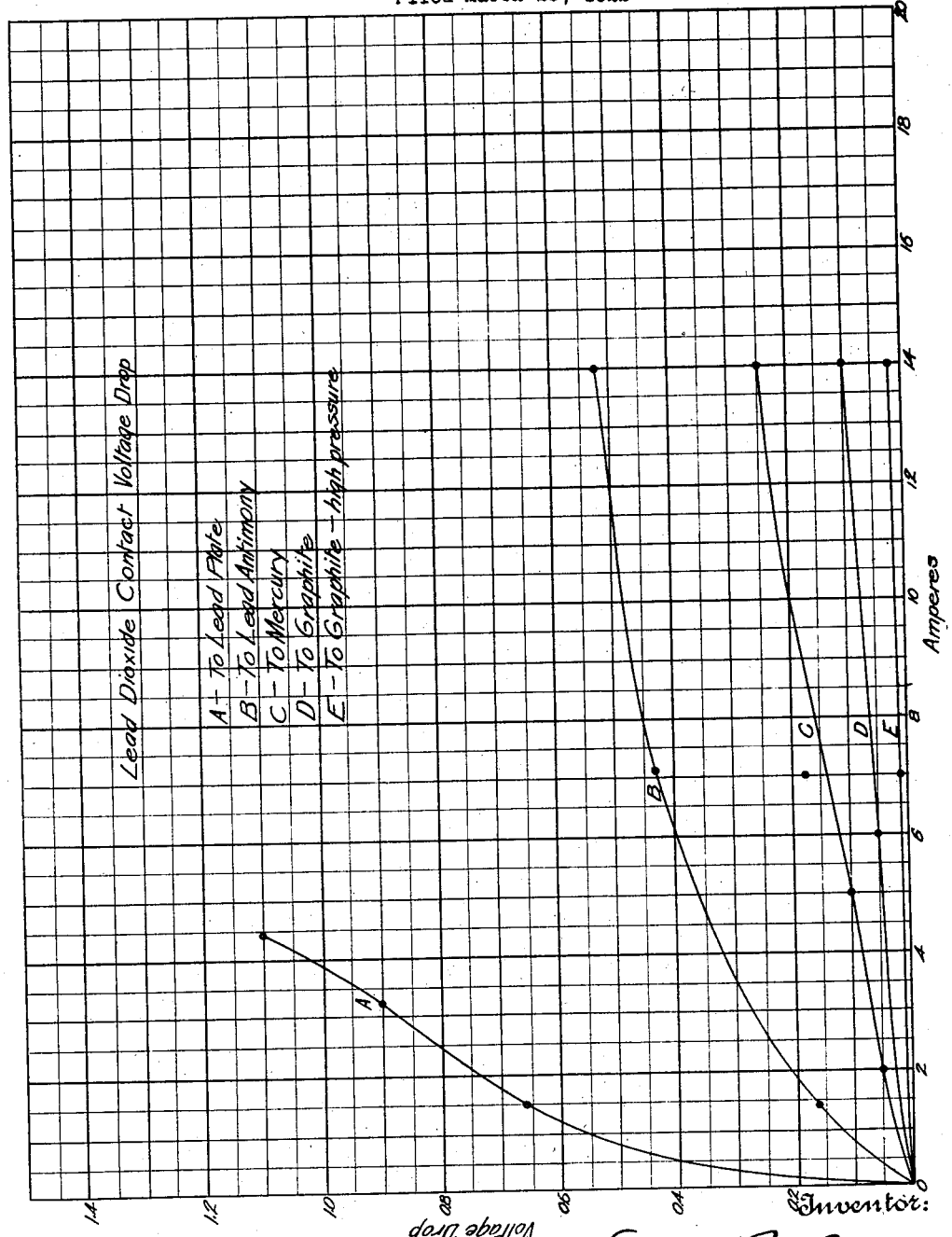

Patented Oct. 27, 1925.

1,559,349

UNITED STATES PATENT OFFICE.

WILLIAM ROY MOTT, OF DECORAH, IOWA, ASSIGNOR, BY MESNE ASSIGNMENTS, TO NATIONAL CARBON COMPANY, INC., OF NEW YORK, N. Y., A CORPORATION OF NEW YORK.

ELECTRICAL CONNECTION.

Application filed March 25, 1922. Serial No. 546,724.

*To all whom it may concern:*

Be it known that I, WILLIAM ROY MOTT, a citizen of the United States, residing at Decorah, in the county of Winneshiek and State of Iowa, have invented certain new and useful Improvements in Electrical Connections, of which the following is a specification.

This invention relates to the production of electrical connections in which a metallic oxid, especially lead dioxid, is one of the connected elements. The invention in its varied applications is based chiefly upon my discovery of the low voltage drop between lead dioxid and graphite.

In connections to lead dioxid as heretofore made, there is generally sufficient initial resistance at the surface of contact to cause appreciable heating. Under these conditions, partial reduction of the lead dioxid to substantially non-conductive lower oxids may take place. The reduction is continuously accelerated, owing to the progressive increase of resistance and heat production, as the lower oxids are formed. The final result may be the stoppage of all current through the connection, even when relatively high voltages are used. It is therefore of the greatest importance to provide a low resistance contact to lead dioxid, in order to avoid the deterioration or destruction of the connection. The present invention provides a contact substantially free from the above mentioned defects, and capable of transmitting even large currents with a low voltage drop.

The invention is applicable in general wherever lead dioxid is to be embodied in an electrical circuit. By way of example, it will be described in connection with electrodes comprising lead dioxid. Electrodes of this type are in general use, especially as anodes in electrolytic decompositions, and are prepared in a number of ways, including moulding lead dioxid or an oxidizable lower oxid into a suitably shaped plate, and depositing lead dioxid electrolytically upon a removable or permanent support. According to the present invention a highly efficient contact to lead dioxid electrodes, however prepared, is obtained by establishing the circuit through graphite pressed into contact with the lead dioxid.

One embodiment of my invention will be described in connection with the accompanying drawing, in which—

Fig. 1 is a side elevation of a graphite plate connection,

Fig. 2 is a similar view, showing a graphite coated clamp, and

Fig. 3 is graph illustrating the efficiency of the lead dioxid-graphite connection.

Referring to Fig. 1 of the drawing, reference numeral 1 denotes a conductive clamp of any suitable type provided with means for pressing a graphite plate 2 against the surface of a lead dioxid electrode 3. A wire or lead 4 connects the clamp with an electrical circuit.

The form of the device shown in Fig. 2 is in general similar to that just described, but the separate graphite plate is dispensed with. I have found that good results may be obtained by merely coating the bottom of the compression plate 5 with graphite 6. The graphite may be mixed with an adhesive before being spread on plate 5, or it may be applied in any other way which will secure the adherence of a thin layer.

Any suitable clamping device may be used, provided it is formed of a good conductive material which makes a low resistance contact to graphite. Copper and iron clamps are satisfactory. In some cases, however, it may be desirable to carry the current directly to the graphite, the conductivity of the clamp then being immaterial.

The connection may be covered with insulating or protective coatings, if desired. Such coatings may consist of paraffin, shellac, or other suitable material.

The voltage drop is decreased as the pressure increases, and I therefore prefer to press the graphite against the electrode with considerable force. Ten to fifteen pounds pressure per square inch may in general be applied without injury to the graphite plate or electrode, and the resulting connection approaches the minimum in voltage drop. However, these pressures are merely illustrative and may be varied as desired. I have also found that better results are obtained by the use of a small graphite area, strongly compressed against the lead dioxid, than by the use of a large area under low compression.

Fig. 3, in which the abscissæ represent amperes and the ordinates volts, illustrates the efficiency of the graphite-lead dioxid connection as compared to lead, lead-antimony, and mercury connections to lead dioxid. Curves A, B, C, and D were plotted for connections under substantially the same pressure conditions; curve E illustrates the beneficial effect of increased pressure. The contact area was one-half square inch. It will be understood that variations in the composition and surface condition of the connected parts may cause minor divergence from the specific figures shown by the graph. The relative value of the connections, however, is as illustrated.

I may apply the graphite connection to other oxids than lead dioxid; for example, such compounds as $Fe_3O_4$, $Cu_2O$ and $Bi_2O_5$, in massive form adapted for use as electrolytic anodes or for other purposes.

My invention includes the use of the graphite-lead dioxid or similar connection in electrical apparatus other than that specifically described above. Rheostats, rectifiers, and lightning arresters are mentioned for the sake of illustration. Suitable mechanical arrangements for positioning the graphite and oxid elements in these and other devices may be made within the scope of the present invention, which in its broadest aspect consists in the connection itself, and is so defined in certain of the appended claims.

I claim:

1. A low resistance electrical connection, comprising graphite compressed upon a conductive metallic oxid.

2. A low resistance electrical connection, comprising graphite compressed upon lead dioxid.

3. A low resistance electrical connection, comprising graphite and conductive metallic oxide elements, and means for pressing such elements into engagement.

4. A low resistance connection to a lead dioxid member, comprising graphite and means for pressing the graphite against said member.

5. The invention according to claim 4, in which the connection is covered with a protective coating.

6. A low resistance electrical connection, comprising a member having a lead dioxid surface, means adapted to press a block toward said member, and graphite compressed between said block and member.

7. A low resistance electrical connection, comprising an electrode having a lead dioxid surface, a graphite plate, conductive means adapted to press the plate into engagement with the electrode, and means for connecting the conductive means in an electrical circuit.

In testimony whereof, I affix my signature.

WILLIAM ROY MOTT.